United States Patent
West

(10) Patent No.: US 6,705,425 B2
(45) Date of Patent: Mar. 16, 2004

(54) REGENERATIVE COMBUSTION DEVICE

(75) Inventor: Phillip B. West, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 221 days.

(21) Appl. No.: 10/037,114

(22) Filed: May 28, 2002

(65) Prior Publication Data

US 2002/0141288 A1 Oct. 3, 2002

Related U.S. Application Data

(60) Provisional application No. 60/241,996, filed on Oct. 20, 2000.

(51) Int. Cl.$^7$ .............................. G01V 1/04; G01V 1/38; G01V 1/40; G01V 1/104
(52) U.S. Cl. ........................ 181/106; 181/102; 181/113; 181/116; 181/117; 367/25; 367/145
(58) Field of Search ................................ 181/102, 106, 181/108, 113, 116, 117; 367/25, 145, 911

(56) References Cited

U.S. PATENT DOCUMENTS

| | | | |
|---|---|---|---|
| 3,587,775 A | * 6/1971 | Baier, Jr. ..................... 181/116 |
| 3,844,262 A | 10/1974 | Dieges ................... 128/119 A |
| 4,372,386 A | 2/1983 | Rhoades et al. ............. 166/300 |
| 4,421,474 A | 12/1983 | Meyer ......................... 431/115 |
| 4,601,170 A | 7/1986 | Fiege ............................ 60/513 |
| 4,722,417 A | * 2/1988 | Selsam ......................... 181/106 |
| 4,796,723 A | * 1/1989 | Laurent et al. .............. 181/102 |
| 5,149,407 A | 9/1992 | Meyer .................... 204/157.41 |
| 5,229,977 A | * 7/1993 | Owen .......................... 181/117 |
| 5,644,911 A | 7/1997 | Huber ........................ 60/39.05 |
| 6,247,316 B1 | 6/2001 | Viteri ............................ 60/716 |

* cited by examiner

*Primary Examiner*—Ian J. Lobo
(74) *Attorney, Agent, or Firm*—Trask Britt P.C.

(57) ABSTRACT

A regenerative combustion device having a combustion zone, and chemicals contained within the combustion zone, such as water, having a first equilibrium state, and a second combustible state. Means for transforming the chemicals from the first equilibrium state to the second combustible state, such as electrodes, are disposed within the chemicals. An igniter, such as a spark plug or similar device, is disposed within the combustion zone for igniting combustion of the chemicals in the second combustible state. The combustion products are contained within the combustion zone, and the chemicals are selected such that the combustion products naturally chemically revert into the chemicals in the first equilibrium state following combustion. The combustion device may thus be repeatedly reused, requiring only a brief wait after each ignition to allow the regeneration of combustible gasses within the head space.

30 Claims, 5 Drawing Sheets

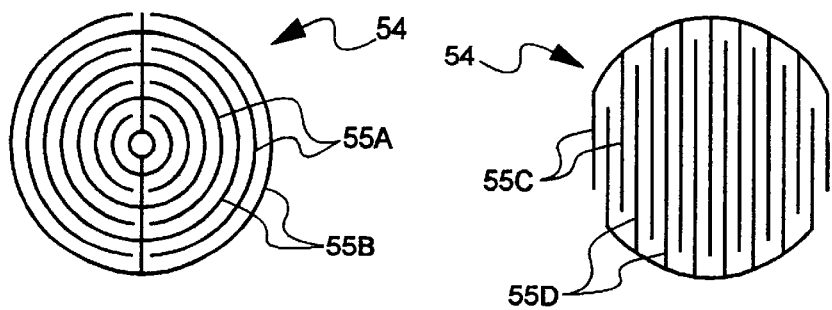
FIG. 2A    FIG. 2B
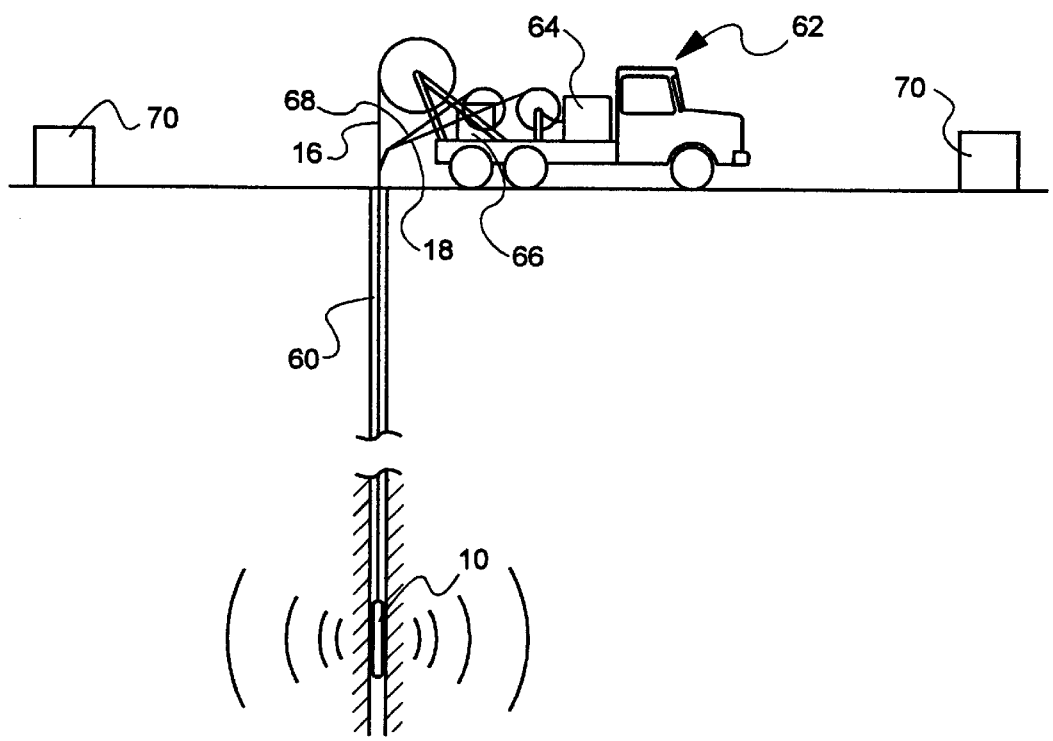
FIG. 3

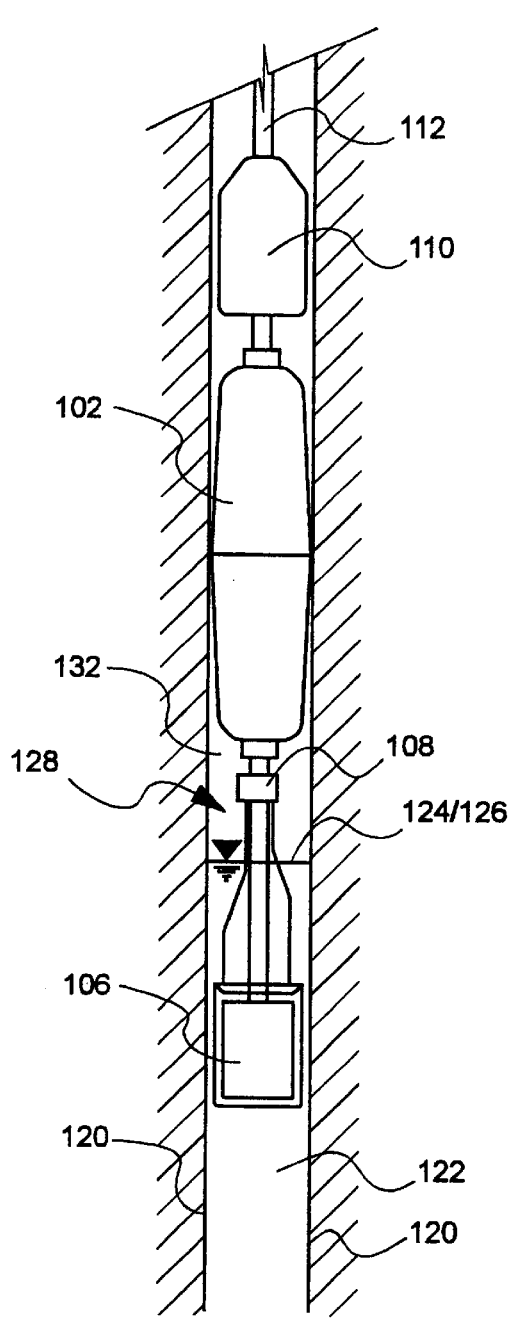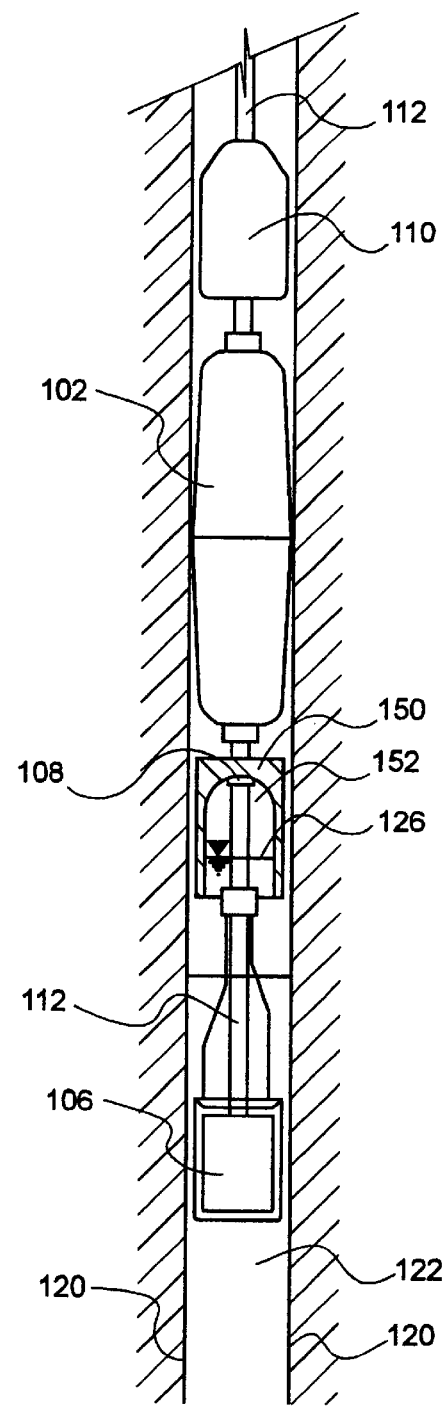
FIG.5A  FIG.5B

REGENERATIVE COMBUSTION DEVICE

RELATED APPLICATION

This application claims priority to U.S. patent application Ser. No. 60/241,996, filed Oct. 20, 2000, and is incorporated herein.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

This invention relates to regenerative combustion devices. More particularly, the present invention relates to a regenerative combustion device which produces a sound source or concussion for seismic surveying, well stimulation, or other purposes.

2. State of the Art

Subsurface exploration, such as for water, oil and gas, or other desired subsurface substances frequently requires the use of subsurface seismic sources. For example, when performing a subsurface survey of a particular region, the surveyor may drill an exploratory well to a desired depth, then lower an explosive charge into the hole on a tether. A plurality of detection stations are placed upon the ground in the area surrounding the exploratory well, and the explosive charge is then detonated. The characteristics of the sound emanating from the explosion are detected and recorded at each detection station. This process provides information which allows the creation of a subsurface profile of the characteristics of the rock strata in the region around the exploratory well.

However, to obtain useful information, it is necessary to repeat this process many times with explosives at different depths, and detection stations in different positions. Accordingly, it is necessary to repeatedly lower new charges into the exploratory well, which may be hundreds or thousands of feet deep. This is a slow process, which significantly impedes the progress of subsurface seismic surveying, and is also expensive because the explosive charges are destroyed with each detonation.

Similarly, concussion devices are also sometimes used to stimulate production in a subsurface well by fracturing the rock strata at certain locations in the well. As with seismic surveying, this procedure is also currently done using explosives, which must be lowered into the well. However, because an oil-bearing formation, for example, may extend for a significant depth, the process is preferably performed several times at varying depths and in multiple wells. Consequently, the same problem of having to repeatedly raise and lower a charge into a well affects this type of operation.

It would therefore be desirable to have a seismic sound source which is regenerative and can repeatedly produce a sonic pulse without having to be removed from its position, and does not require the addition of chemicals for each ignition.

SUMMARY OF THE INVENTION

To address some of the above and other needs, the present invention comprises a regenerative combustion device, such as a sealed vessel, having a combustion zone, and chemicals contained within the combustion zone having a first equilibrium state, and a second combustible state, and means for transforming the chemicals from the first equilibrium state to the second combustible state, such as electrodes. An igniter, such as a spark plug or similar device, is disposed within the combustion zone for igniting combustion of the chemicals in the second combustible state. Advantageously, the combustion products are entirely contained within the combustion zone, and the chemicals are selected such that the combustion products naturally chemically decay into the chemicals in the first equilibrium state over time following combustion. The combustion device may thus be repeatedly reused, requiring only a brief wait after each ignition to allow the combustion products to precipitate or regenerate back to the first equilibrium state.

In an alternative embodiment, the combustion zone may be formed by means of packers which are disposed above and below a region of a well, such that the sides of the well are directly exposed to the combustion. This promotes fracture of the rock strata of the sides of the well so as to stimulate liquids flowing from the pores in the rock layer.

In yet another alternative embodiment, the sealed device may be entirely buried, such that ignition may be caused at will over long or unpredictable intervals at the precise location of the device. The device may also be used in water as a seismic source for underwater surveying, etc.

Other advantages and features of the present invention will be apparent to those skilled in the art, based on the following description, taken in combination with the accompanying drawings.

BRIEF DESCRIPTION OF THE DRAWINGS

FIG. 2A is a horizontal cross-section of the electrodes of the device of FIG. 1, showing one possible configuration for the electrode plates;

FIG. 2B is a horizontal cross-section showing an alternative configuration for the electrode plates of the device of FIG. 1;

FIG. 3 is a pictorial view of a typical setup for seismic surveying using the regenerative combustion device of the present invention as the seismic sound source;

FIG. 5A is a vertical cross-section of an alternative device wherein only an upper packer is used;

FIG. 5B is a vertical cross-section of an alternative embodiment of the device of FIG. 5A including a gas trap.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
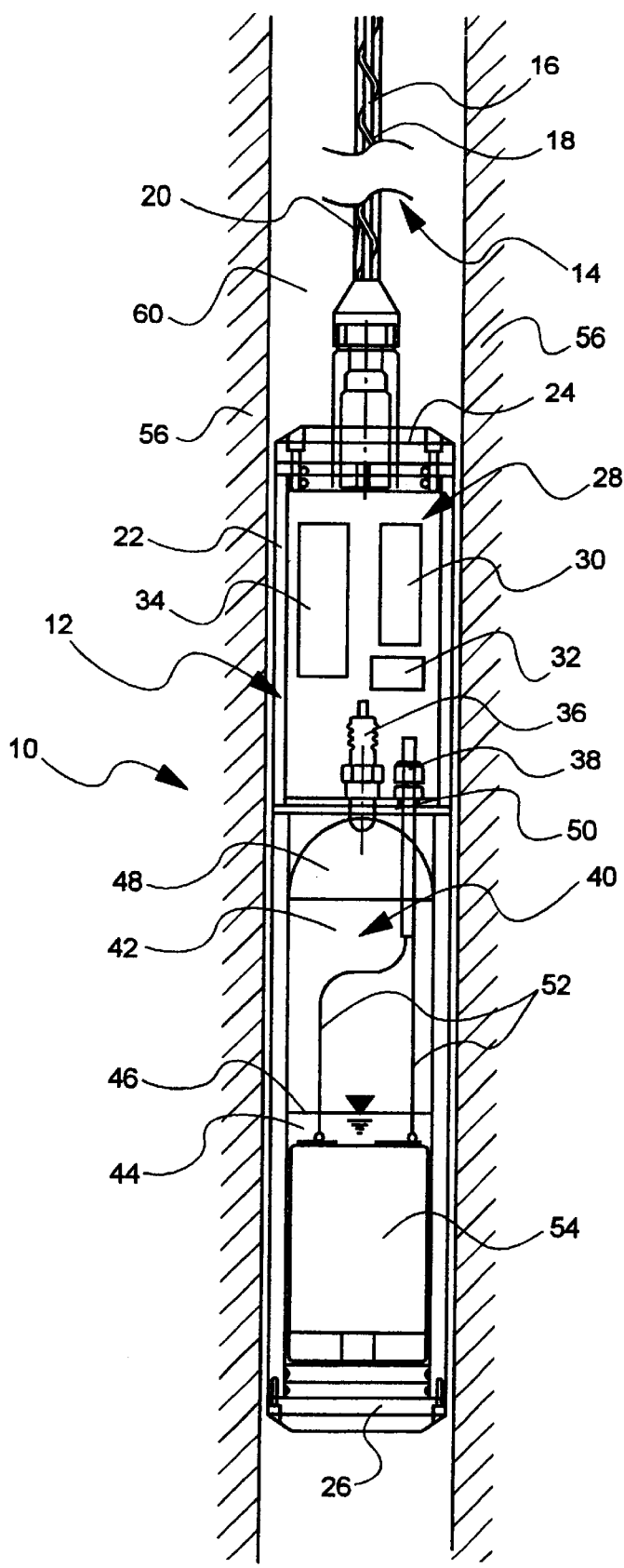
FIG. 1 is a vertical cross-section of a sealed regenerative combustion device according to the present invention.

Viewing FIGS. 1 and 2, in its preferred embodiment the regenerative combustion device 10 generally comprises a sealed vessel 12 at the end of a long tether 14. The tether generally comprises a load bearing cable 16 for supporting the weight of the vessel, and an electrical cable 18 for transmitting electricity to the vessel. Other electrical cables 20 may also extend along the tether to allow monitoring and control of the electrical components of the device.

The vessel 12 generally comprises a substantially cylindrical shell 22, a cap 24 disposed at the top, and a base 26 at the bottom. The cap 24 includes a connector 26 for connecting the vessel to the tether 14. The interior of the vessel is divided into two general parts. Within the upper portion of the vessel is an electronics cavity 28 containing voltage conversion components 30, ignition control circuitry 32, an ignition source 34, an igniter 36, and electrode connections 38. The electronics convert the electrical power received through the electrical cable 18 into the appropriate voltage for the electrodes and the igniter, respectively.

Disposed below the electronics cavity 28 is the combustion chamber 40. The upper portion of the combustion chamber forms a head space 42, while the lower portion of the combustion chamber contains liquid electrolyte 44 having a free liquid surface 46. The head space 42 is the combustion zone, where combustion of gaseous components takes place. The igniter 36 protrudes through the top of the combustion chamber, within a dome 48 or other shaped top of the combustion chamber. The igniter 36 may be a device comparable to a spark plug, which creates an electrical arc when provided with a suitable electrical current, or it may be some other device, such as a hot wire which heats up when provided with electrical current. Other methods of igniting combustible vapors within the head space may also be used, such as a hot wire, a plasma discharge, a catalyst, shock, or spontaneous combustion due to increased pressure in the head space may all function to cause ignition of the combustible vapors. Other methods of igniting the vapors may also be apparent to those skilled in the art.

The dome 48 may be spherical, ellipsoidal, parabolic, conical, or any other shape as desired. A bulkhead 50 above the dome 48 provides a protective barrier between the combustion chamber and the relatively sensitive electronics above. As an alternative, the device may be constructed without the dome 48, instead merely providing the bulkhead 50 as the top of the combustion chamber. By virtue of its shape, the dome or other shaped top of the combustion chamber distributes the force of the explosion into the sides, floor, and top of the combustion chamber and thereby affects the nature of the sound signal produced. For example, the characteristics of the sound signal (e.g. frequency, amplitude, direction of propagation, etc.) produced with a spherical dome will differ from that produced under identical conditions with a conical dome or a flat bulkhead.

Electrical lines 52 extend from the electrode connections 38 in the electronics cavity to a set of gas generation plates 54, shown more clearly in the downward-looking cross-sectional views of FIGS. 2A and 2B. The gas generation plates 54 may take a variety of shapes. The primary criteria for their shape is that they maximize surface area of contact with the electrolyte solution (in order to maximize the rate of electrolysis) and that opposing poles do not touch. As shown in FIG. 2A, the plates may comprise a pair of interleaved arcuate plates 55a and 55b. Alternatively, as shown in FIG. 2B, the plates may comprise interleaved flat plates 55c and 55d, which are formed to occupy a circular area. It will be apparent that many other shapes may also be used. The gas generation plates 54 are preferably formed of a relatively inert material such as stainless steel or platinum, so that plating does not occur.

The preferred electrolyte solution is water with just enough sodium hydroxide (NaOH) added to increase conductivity without causing plating upon the electrodes. It is not necessary to add electrolyte. However, an addition of a small amount has been found to improve the efficiency of the electrolytic conversion for a given voltage, and to extend the life of the electrodes. Those skilled in the art will recognize that other electrolytes could be used with similar results.

The head space preferably contains ordinary atmospheric air, though it may be at slightly lower than atmospheric pressure in the embodiment of FIG. 1. A lower pressure may help increase the rate of off-gassing during electrolysis, and make the device faster and more efficient in operation. Additionally, as with the shape of the dome 48 and head space 42, the head space pressure and content (the total combination and concentrations of gasses) are variables which may be adjusted to manipulate the characteristics of the sound signal produced by ignition. Adjusting the pressure and/or the concentration of O2 and H2 can also help improve combustion properties, speed, reliability, etc.

In their initial condition, the air in the head space and the electrolyte are in a first state of chemical equilibrium. When electrical power is provided to the electrodes, the water is electrolyzed into gaseous hydrogen and oxygen, as is well known by those skilled in the art, which bubbles up to the top of the electrolyte solution to reside in gaseous form in the head space. A slightly lower than atmospheric pressure in the head space may allow a higher concentration of gaseous hydrogen and oxygen to enter the head space. Because of the large surface area of the electrodes relative to the volume of the electrolyte solution, the electrolysis takes place relatively rapidly.

Eventually, a second combustible condition is reached wherein the gasses in the head space have reached a suitable energy level. When this combustible condition is reached, the gaseous species in the head space are ready for ignition. Electrical power to the electrodes 54 is stopped, and electrical power is provided to the igniter 36, which causes a rapid chemical combination of the hydrogen and oxygen back into water (in the form of vapor), according to the following equation:

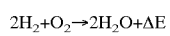
$$2H_2 + O_2 \rightarrow 2H_2O + \Delta E$$

The symbol $\Delta E$ represents energy released by the reaction, which energy comprises both heat and mechanical concussion. The reaction product (water vapor) is contained within the combustion chamber, where most of it rapidly condenses back into liquid water, and flows back into the electrolyte solution. Accordingly, the chemicals in the combustion chamber revert back to their first equilibrium condition, or very nearly so, and the process may then be repeated.

The result is a reversible combustion system in the sens that electrical energy is applied to a solution of chemicals to transform the electrical energy into chemical potential energy, then the chemical energy is transformed into mechanical and thermal energy through combustion, with the products of combustion being the original chemicals. The inventor has found that the regenerative combustion sound source is capable of repeated combustion at intervals of from a few minutes, to as rapidly as every few seconds, depending upon the electrical power input and the desired energy of combustion. Generally, the more power is used, the faster the system regenerates. Conversely, the higher the desired energy of combustion, the more time will be required to produce the needed combustible gasses. It will be apparent that other chemical combinations may be used to create a reversible combustion reaction. However, it is believed that the combustion of hydrogen is the fastest such reaction, and that the use of other chemicals would produce a slower combustion reaction, thus producing a sound signal of lower magnitude.

The force of the combustion is transmitted through the vessel wall 22, to the walls 56 of the well 60, and into the surrounding rock strata. It will be apparent that the shell 22, dome 48, base 26, and gas generation plates 54 must necessarily be designed to withstand the impact forces of repeated ignition in the combustion chamber. These components are preferably made of stainless steel, platinum, or other strong, relatively inert material. The strength is required to so that the vessel will withstand the repeated combustion pressure which is generated inside, and the high static pressure exerted by water outside the vessel. The inertness is required to reduce corrosion, to prevent contamination of the electrolyte solution, and to prevent chemical degradation of the vessel as a result of the combustion. For example, carbon steel is not appropriate because it would gradually pollute the electrolyte with iron. Other materials such as aluminum, or platinum plated steel could also be used.

A typical setup for seismic surveying using the regenerative combustion device of the present invention is shown in FIG. 3. In typical use, the regenerative combustion device 10 is lowered into a well 60 from a support vehicle 62, which includes an electrical power source, such as a generator 64. The vehicle may also include a pump 66 and hose 68 for providing pressurized fluid for devices in the well, or other operations as needed. Detection stations 70 are placed upon or in the ground at selected locations surrounding the well. The concussion caused by the combustion device 10 creates a compression wave outside the vessel, which propagates through the adjacent rock strata, and thus provides information regarding the characteristics of the strata in the area of the detection stations 70. To obtain complete information, ignition of the device 10 may be repeated at various depths, and/or the detection stations may be moved to different locations. Advantageously, because the combustion device 10 is regenerative, it need not be raised from the well, which may be hundreds or thousands of feet deep, between ignitions. This configuration saves significant time in the exploration process, and allows more rapid seismological surveying.

The regenerative combustion device shown in FIG. 1 may also be buried within a well to provide a permanent installation, as is typical in oil field monitoring. In such a case, one or more such devices are lowered into a well, whereupon sand and gravel are placed atop them with the tether extending out of the top of the filled hole to the electrical and control source. These devices may then be triggered at will (either locally or remotely) to provide concussion for seismic surveying, or stimulation of adjacent strata.

Subsurface concussion devices are sometimes used to stimulate production in a subsurface well by disturbing the rock strata at certain locations near the well. For example, an oil well may be stimulated to produce oil at a faster rate if oil-bearing strata adjoining the well are stressed to deform the pore spaces, allowing the oil to flow into the well faster. As with seismic surveying, this procedure is typically performed with conventional explosive devices. However, because oil-bearing formations may extend for a significant depth, the process is desirably performed several times at varying depths and in multiple wells. With prior systems, the explosive device (which may include more than one charge) must be retrieved and lowered into the well for repeated use. Once again, this requires the time-consuming task of repeatedly raising and lowering the device into a well.

To address this problem, the inventor has developed an alternative embodiment of the present invention. Viewing FIG. 4, the alternative regenerative combustion device 100 generally comprises an upper packer 102, a lower packer 104, with a gas generation electrode assembly 106 and an igniter 108 disposed between the packers. An electronics housing 110 may be disposed above the top packer, and contains voltage conversion components, ignition control circuitry, etc., as described above with relation to the embodiment of FIG. 1. All of the components of the device are suspended from a tether 112 which extends to the ground surface above, and which contains an electrical supply line 114, a fluid line 68 for the packers, and other necessary connections to the support equipment at the surface.

The packers 102 and 104 are conventional and are well known in the well drilling industry, and when filled with fluid, expand to contact the walls 120 of the well 122 to provide a secure seal of one portion of the well from the remainder. Fluid for the packers is provided through a hose 68 disposed within the tether which extends to a pump 66 at the surface, as described above (FIG. 3).

Figure 4:
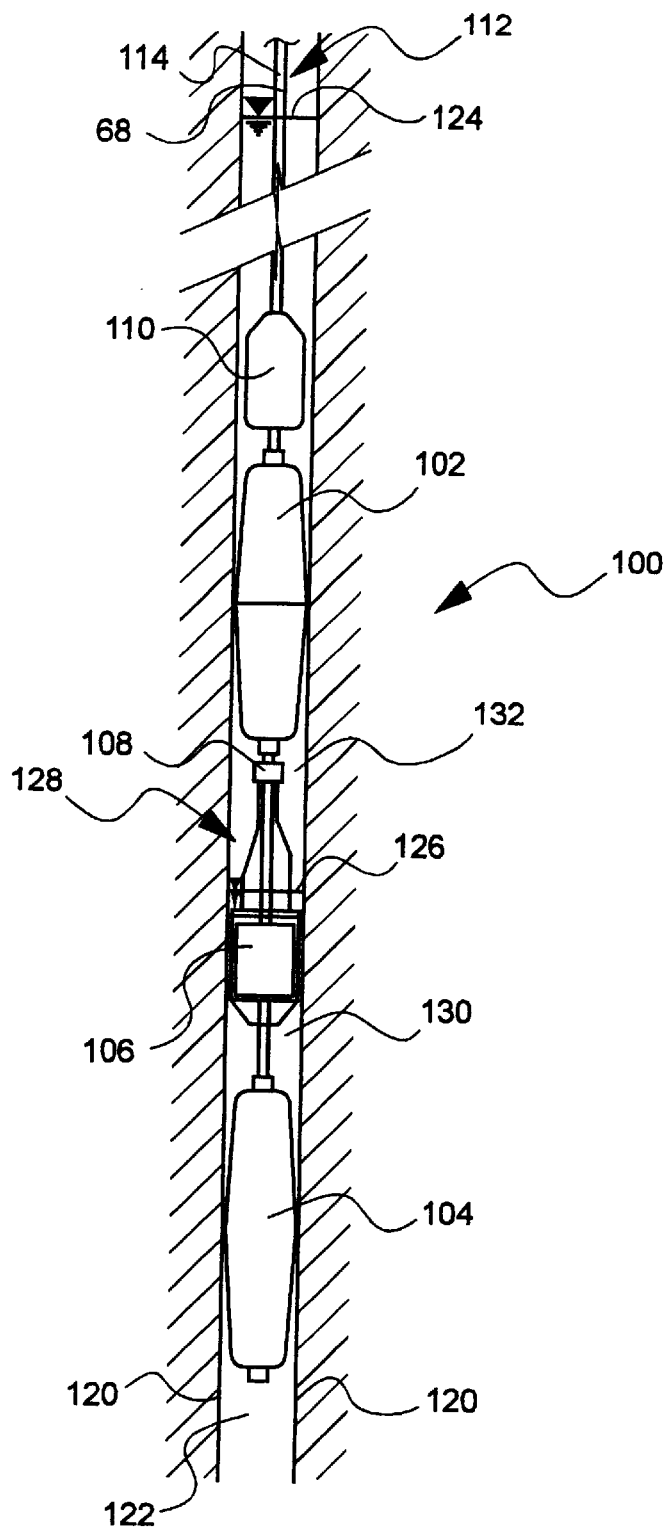
FIG. 4 is a vertical cross-section of an alternative regenerative combustion device according to the present invention wherein the combustion zone is formed by upper and lower packers disposed in the well.

To use the device 100 depicted in FIG. 4, the device with the packers 102 and 104 deflated, is first lowered to the desired location in the well. This location will usually be below a free water surface 124 within the well. The packers are then inflated to firmly grip the sidewalls of the well, and some or all of the water between the packers is pumped out of the space therebetween to form an artificial water level 126. This water may be pumped out through the hose 68 by means of pump 66, if well is full of water and/or alternatively, compressed air may be injected into the space between the packers. It will be apparent that the device 100 may also be used in wells at a location above a free water level. In such a case, rather than pumping water out of the space between the packers, water may be introduced into the space between the packers through hose 68.

With the packers firmly in place and the artificial water level established, the space between the packers now forms a combustion chamber 128, with liquid electrolyte 130 in the bottom and a head space 132 in the top. Well water is the eletrolyte. It will be apparent that when using the water already in the well, it is unnecessary to add an electrolyte to the water because well water is naturally hard, and will already have a significant natural conductivity. The only drawback to using the natural well water is that plating of the electrodes will occur more readily, making the life of the device shorter. The electrolyte 130 may fill the bottom of the combustion zone up to a point where it covers the electrode assembly 106, but leaves the top portion of the combustion chamber open. Alternatively, the water level may be lowered to just below the inlet of hose 68, or just below the igniter.

The combustion device of FIG. 4 is actuated in the same manner as that of FIG. 1, described above. First, electrical power is provided to the electrodes 106 through an electrical supply line from the electronics housing 110, which receives the power through the electrical cable 114 disposed within the tether. The electrical current between the electrodes causes the water to dissociate into gaseous hydrogen and oxygen, which fill the head space 132. Once the electrolysis has progressed sufficiently, electrical power is sent to the igniter 108, which ignites the hydrogen and oxygen, causing a small explosion within the combustion chamber. Unlike the embodiment of FIG. 1, however, the explosion is not contained within a vessel, but between the packers 102 and 104 and the walls 120 of the well. Consequently, the walls of the well absorb direct impact from the explosion, causing the rocks in the walls to be disturbed to allow greater flow of liquid through the pores in the rocks.

Nevertheless, because the explosion is contained within the combustion chamber, the water vapor produced by the combustion will gradually condense into liquid water and refill the bottom of the combustion chamber, reforming the electrolyte solution in its initial condition, or nearly so. When the electrolyte regains a suitable level within the combustion chamber relative to the electrodes, the process of electrolysis and ignition may be repeated to cause another explosion, without having to move the packers or any other component of the system. Combustion may thus be repeated as many times as desired, until gradual chemical or physical changes in the electrolyte solution and the combustion chamber (as a result of repeated concussion against the well walls) requires repositioning the device.

The lower packer 104 is optional in certain circumstances. For example, as shown in FIG. 5A, the device can be effectively used when lowered into a well down to a static water table 124 but no further, such that the electrode assembly 106 extends into the water, but the igniter 108 and the upper packer 102 are above the free water surface so as to create a combustion chamber bounded on the top by the packer, and on the bottom by the free water surface.

Alternatively, and more likely, the device may be lowered to a level below the free water surface. The head space may then be partially evacuated by pumping compressed air below the packer 102, such that an artificial water surface 126 is created, but the electrodes remain submerged. Alternatively, the system may be entirely submerged, and the head space created by off-gassing from the electrodes. When electrical power is provided to the electrodes, gaseous oxygen and hydrogen bubble up against the lower surface of the packer, and form a head space around the igniter. The gasses may then be ignited, and the process repeated.

As yet another alternative, a gas trap 150 may be attached to the tether 112 between the packer and the electrodes, as depicted in FIG. 5B. The igniter 108 is contained within the top of the gas trap. Pressurized air may be introduced into the top of the gas trap to form a head space 152, in the manner described above. Alternatively, when electrical power is provided to the electrodes 106, bubbles of hydrogen and oxygen are captured by the gas trap as they float upward, forming the gaseous phase head space 152 within the gas trap 150. The result is a head space combustion zone bounded on the bottom by the water surface 126, and elsewhere by the inside of the gas trap, rather than by the bottom of the packer 102, as in FIG. 5A.

The gas trap 150 is preferably formed of stainless steel or other strong, relatively inert material, the inside of which may have a domed, conical, ellipsoid, flat, or other desired shape as described above (with regard to dome 48, FIG. 1). Once the gasses in the combustible state are present in the gas trap, the igniter is fired, and the gasses combust in the manner described above.

Figure 6:
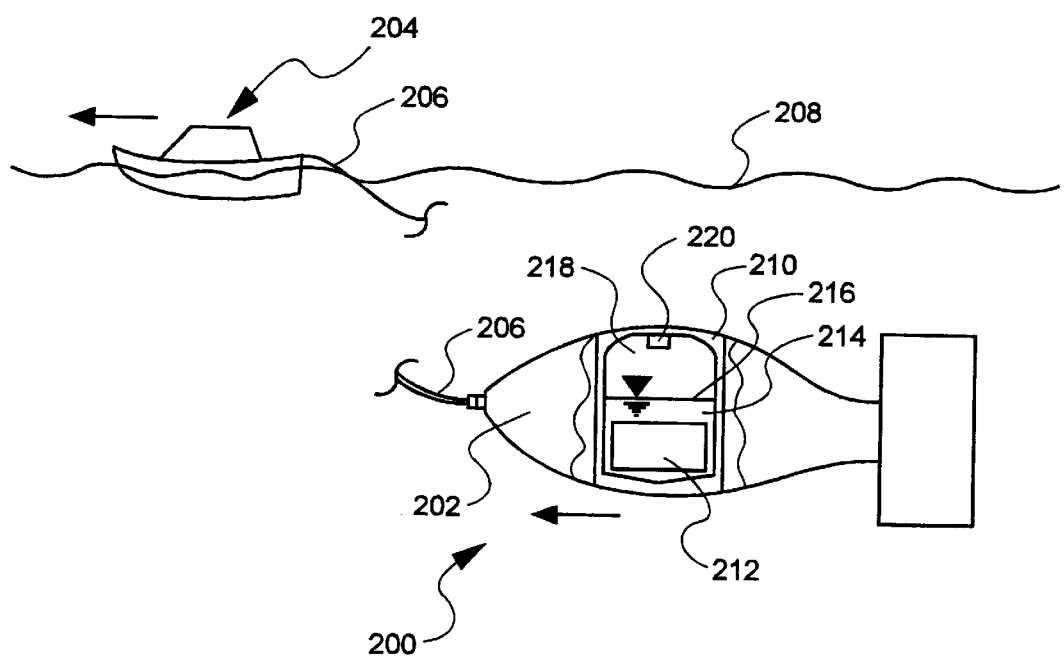
FIG. 6 is a view of the device configured for marine use.

The regenerative combustion device of the present invention may also be configured for marine use as shown in FIG. 6. In this embodiment, the device 200 comprises a hydrodynamic outer casing 202, which is connected to a vessel such as a boat 204 by a tether 206, and towed below the surface of the water 208. It will be apparent that the device 200 could be towed by surface or subsurface vessels in the same manner. The casing 202 is configured to maintain a stable orientation as the device is towed through the water. Within the casing, as shown by the partial broken-out section, is a vertically oriented combustion vessel 210 having electrodes 212, an electrolyte 214 with a surface 216, and a head space 218 having an igniter 220.

The marine device of FIG. 6 operates in the manner described above with regard to the other embodiments. In a typical marine application, the device 200 is towed through the water and periodically fired to provide a sound source. Receivers (not shown) disposed elsewhere, whether on other vessels, on the ocean floor, or suspended from buoys, etc., receive the signal as it is reflected back from the ocean floor. As with the other embodiments described above, the shape of the combustion chamber, the shape of the device, and the chemical and physical factors associated with the combustion may all be modified to adjust the characteristics of the sound. The device in this configuration is useful for seismic surveys of submerged geology and geography.

The preferred embodiment may also be adapted such that deployment is made conjunction with a drill string. This includes a configuration wherein the device is a drill string segment. This allows for seismic surveys, ahead of drilling, requiring only a minor interruption of drilling and no withdrawal of drill string.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A regenerative combustion device, comprising:
   a combustion zone comprising a space at least partially bounded by a subterranean surface of a well;
   chemicals contained within the combustion zone, having a first equilibrium state, and a second combustible state;
   means for transforming the chemicals from the first equilibrium state to the second combustible state; and
   an igniter configured to ignite the chemicals in the second combustible state, wherein the chemicals in the first equilibrium state comprise an aqueous solution of water and an electrolyte and the chemicals in the second combustible state comprise gaseous hydrogen and gaseous oxygen and wherein combustion products of the ignition are contained within the combustion zone, and the chemicals are selected such that the combustion products substantially reversibly transform into the chemicals in the first equilibrium state following combustion.

2. The regenerative combustion device of claim 1, wherein the combustion zone further comprises a space at least partially bounded by at least one well packer positioned within the well.

3. The regenerative combustion device of claim 2, wherein the at least one well packer comprises a pair of well packers and the combustion zone further comprises a space at least partially bounded between the pair of well packers.

4. The regenerative combustion device of claim 3, further comprising a hose in communication with the combustion zone configured to pump at least some of the chemicals out of the combustion zone.

5. The regenerative combustion device of claim 1, wherein the combustion zone further comprises a space at least partially bounded by a gas trap positioned within the well.

6. The regenerative combustion device of claim 1, wherein the means for transforming the chemicals from the first equilibrium state to the second combustible state comprises at least one electrode disposed in contact with the aqueous solution.

7. The regenerative combustion device of claim 1, wherein the igniter comprises at least one of a spark plug, a hot wire, a plasma discharge device, a piezo-electric element, increased pressure, and shock applied to the chemical in the second combustible state.

8. The regenerative combustion device of claim 1, wherein the aqueous solution of water and an electrolyte comprises well water.

9. A regenerative seismic sound source for seismological surveys comprising:
   a chamber at least partially bounded by a subterranean surface of a well and containing a liquid electrolyte and a head space;
   a plurality of electrodes disposed in contact with the liquid electrolyte;
   an igniter disposed in the head space; and
   an electrical power source configured to provide electrical power to the electrodes so as to cause the electrolyte to form a combustible mixture within the head space and also to the igniter so as to ignite the combustible mixture within the head space and produce combustion products therefrom, the combustion products being entirely contained within the chamber, the combustible mixture being of a composition such that the combustion products substantially reversibly transform back into liquid electrolyte over time following combustion.

10. The regenerative seismic sound source of claim 9, wherein the liquid electrolyte comprises well water.

11. The regenerative seismic sound source of claim 9, wherein the combustible mixture comprises gaseous hydrogen and gaseous oxygen in the head space.

12. A system for conducting seismological surveys comprising:
   a subterranean well;
   a regenerative seismic sound source comprising:
      a combustion zone at least partially bounded by a surface of the subterranean well;
      chemicals contained within the combustion zone, having a first equilibrium state, and a second combustible state;
      means for transforming the chemicals from the first equilibrium state to the second combustible state;
      an igniter for igniting combustion of the chemicals in the second combustible state;
   a positioning device configured to position the regenerative seismic sound source within the well;
   an electrical power source coupled to the means for transforming the chemicals so as to transform the chemicals from the first equilibrium state to the second combustible state, and also coupled to the igniter to cause ignition and combustion of the combustible chemicals within the combustion zone; and
   sensors for detecting seismic waves produced by the seismic sound source.

13. The system of claim 12, wherein the chemicals in the first equilibrium state comprise an aqueous solution of water and an electrolyte.

14. The system of claim 13, wherein the aqueous solution of water and an electrolyte comprises well water.

15. The system of claim 12, wherein the combustion zone is further bounded at a top portion thereof by a device comprising one of a well packer and a gas trap.

16. The system of claim 15, further comprising a conduit in communication with the combustion zone configured to provide pressurized air thereto and create a head space therein.

17. The system of claim 15, wherein the combustion zone is further bounded at a bottom portion thereof by a well packer.

18. The system of claim 17, further comprising a conduit in communication with the combustion zone configured to pump at least a portion of the chemicals out of the combustion zone.

19. A method of conducting seismological surveys, the method comprising:
   positioning a regenerative combustion device at a first location within a subterranean well, wherein the combustion device has a combustion zone which is bounded at least partially by a surface of the subterranean well;
   providing the regenerative combustion device with a supply of chemicals comprising aqueous solution of water and at least one electrolyte selected to produce a combustible gas having combustion products substantially transformable into the supply of the chemicals;
   providing electrical current to the regenerative combustion device to cause production of a combustible gas within the combustion zone through electrolysis of at least a portion of the supply of chemicals, and to ignite the combustion of the combustible gas within the combustion zone; and
   detecting seismic waves produced in the ground as a result of the combustion.

20. The method according to claim 19, wherein the positioning a regenerative combustion device within the well further comprises positioning within the well at least one additional packer below the igniter and a plurality of electrodes to further bound the combustion zone.

21. The method according to claim 20, further comprising pumping compressed air into the combustion zone so as to form a head space therein, disposing the igniter in the head space, and disposing the electrodes at least partly in water located below the packer.

22. The method according to claim 20, wherein the positioning a regenerative combustion device within the well further comprises positioning within the well at least one packer below the igniter and a plurality of electrodes to further bound the combustion zone.

23. The method according to claim 19, further comprising maintaining the regenerative combustion device within the well, providing electrical current to the regenerative combustion device a second time to regenerate the combustible gas within the combustion zone through electrolysis and igniting the regenerated combustible gas within the combustion zone.

24. The method according to claim 23, further comprising repositioning the regenerative combustion device to a second location within the well prior to the providing electrical current a second time.

25. A method of performing regenerative combustion, the method comprising:
   forming a combustion chamber bounded at least in part by a subterranean surface;
   disposing a liquid electrolyte within the combustion chamber;
   creating a combustible mixture from at least a part of the liquid electrolyte;
   igniting the combustible mixture and producing combustion products therefrom;

retaining the combustion products within the combustion chamber; and substantially reversibly transforming the combustion products back into liquid electrolyte.

26. The method according to claim 25, wherein the disposing a liquid electrolyte comprises positioning a free water surface of a static water table within the combustion chamber.

27. The method according to claim 25, wherein the creating a combustible mixture includes creating gaseous hydrogen and gaseous oxygen.

28. The method according to claim 25, wherein the creating a combustible mixture includes subjecting the liquid electrolyte to electrolysis.

29. The method according to claim 25, wherein igniting the combustible mixture includes providing heat to the combustible mixture.

30. The method according to claim 25, wherein igniting the combustible mixture includes pressurizing the combustible mixture.

* * * * *